United States Patent
Richman et al.

(10) Patent No.: US 6,969,315 B2
(45) Date of Patent: Nov. 29, 2005

(54) BASKET DOOR EXTENSION FOR A COTTON HARVESTER

(75) Inventors: Kevin S. Richman, Sherrard, IL (US);
Lyle P. Mangen, Bettendorf, IA (US);
James W. Minnihan, Moline, IL (US)

(73) Assignee: CNH America LLC, Racine, WI (US)

( * ) Notice: Subject to any disclaimer, the term of this patent is extended or adjusted under 35 U.S.C. 154(b) by 20 days.

(21) Appl. No.: 10/799,544

(22) Filed: Mar. 11, 2004

(65) Prior Publication Data
US 2005/0202860 A1    Sep. 15, 2005

(51) Int. Cl.[7] ............................................. A01D 46/22
(52) U.S. Cl. ........................................ 460/119; 56/28
(58) Field of Search ........................... 56/28, 474, 476, 56/480; 460/119; 414/111

(56) References Cited

U.S. PATENT DOCUMENTS

| | | | |
|---|---|---|---|
| 161,543 A | 3/1875 | Patton | |
| 1,484,891 A | 2/1924 | Klein | |
| 2,573,714 A | 11/1951 | Karl | |
| 4,519,189 A | 5/1985 | Fachini et al. | |
| 4,930,297 A | 6/1990 | Schlueter et al. | |
| 5,407,390 A * | 4/1995 | Carney et al. | 460/119 |
| 5,540,144 A * | 7/1996 | Schrag et al. | 100/188 R |
| 5,601,486 A | 2/1997 | Schlueter | |
| 6,134,870 A * | 10/2000 | Lippens et al. | 56/432 |
| 6,206,779 B1 | 3/2001 | Gerber et al. | |
| 6,263,651 B1 | 7/2001 | Schaeffer et al. | |
| 6,431,062 B1 * | 8/2002 | Hawlas et al. | 100/188 R |
| 6,443,836 B1 | 9/2002 | Horejsi et al. | |
| 6,478,523 B1 * | 11/2002 | Meijer | 414/111 |
| 6,766,634 B2 * | 7/2004 | Covington et al. | 56/480 |

* cited by examiner

Primary Examiner—Meredith Petravick
(74) Attorney, Agent, or Firm—Brant T. Maurer; Rebecca Henkel (57) ABSTRACT

A foldable extension for an unloading door of a cotton receiving receptacle of cotton harvester which, when in a deployed position, increases the overall length of the door and directs cotton conveyed over the extension in a downward direction so as to facilitate more precise placement in a receiving receptacle. The extension does not have to be folded to its stored position each time the unloading door is closed, and when folded into its stored positions, does not increase the overall height of the harvester or interfere with telescopic operation of upper and lower portions of the basket.

30 Claims, 6 Drawing Sheets

BASKET DOOR EXTENSION FOR A COTTON HARVESTER

TECHNICAL FIELD

This invention relates generally to a foldable extension for an unloading door of a cotton receiving receptacle of cotton harvester, and more particularly, to an extension which, when in a deployed position, increases the overall length of the door and directs cotton conveyed over the extension in a downward direction so as to facilitate more precise placement in a receiving receptacle. The extension does not have to be folded to its stored position each time the unloading door is closed, and when folded into its stored positions, does not increase the overall height of the harvester or interfere with telescopic operation of upper and lower portions of the basket.

BACKGROUND ART

Some baskets of cotton harvesters include an open side for unloading cotton from the basket interior to another location such as another basket, a wagon, or the like. The basket is typically raised to an unloading position and includes a door movable between an upwardly extending closed position enclosing the open side of the basket, and an open or unloading position extending outwardly from the open side of the basket as a continuation of a floor or other lower surface thereof and over which the cotton from the basket can be conveyed so as to be dumped or dropped into or on the other location or receiving receptacle.

Generally, it is desirable for such doors to have a capability for extending a distance from the cotton harvester basket up to about equal to the sideward extend of cotton harvester row units which extend in a line across the front of the harvester. This is to enable the harvester to be driven up to a position beside a cotton receptacle for unloading or dumping into the receptacle without significant maneuvering, particularly backing maneuvers. However, in many regions there are height limits imposed on cotton harvesters to allow movement under bridges and utility lines, both when self-propelled and when trailered, which limits are not to be exceeded by the basket or the basket door when closed. As a result, the sideward extend of the door must be correspondingly limited, or, if a longer sideward extent is desired or required, the door must be constructed so as to have a sideward length greater than its upward extend when in a transport mode.

As one alternative for a door having a longer sideward extent in the open position and a shorter height when closed, a foldable door could be used, that is, a door that folds at one or more locations along the length thereof. However, this may be an undesirable alternative if the thickness or sideward extent of the folded door is such that it significantly decreases the capacity of the basket. Many baskets include an upper portion which is telescopically received in a lower basket portion for transport, and any folding door should not interfere with this telescopic operation, nor extend outwardly so as to significantly increase the overall width of the harvester when shipped on trailers and rail cars with the harvesting units removed. Also, a folding door can require complex apparatus such as large fluid cylinders for automatic operation, and folding a door each time the basket is unloaded can be time consuming and result in more required maintenance and service.

Thus, what is sought is an unloader door or extension therefor, which when deployed provides an increased sideward extent, but which overcomes many of the shortcomings and problems set forth above.

SUMMARY OF THE INVENTION

What is disclosed is an extension for an unloader door of a cotton receiving basket of a cotton harvester, which provides one or more of the sought after features and overcomes many of the shortcomings and problems set forth above. According to a preferred aspect of the invention, the door has a proximal end connected adjacent to a floor of a cotton harvester basket for pivotal movement between a closed position in closing relation to an open side of the basket and an open position extending sidewardly from the floor in generally parallel relation thereto. The door has a distal end opposite the proximal end and a cotton conveying surface which faces the interior when the door is in the closed position and which faces upwardly when the door is in the open position and includes elements movable for conveying the compacted cotton from the interior of the basket sidewardly to the distal end. The extension according to the invention is supported adjacent to the distal end of the door for pivotal movement between a stored position in overlaying relation to the distal end of the door and a deployed position extending sidewardly therefrom, the extension including a free end which when the door is open and the extension is in the deployed position is preferably spaced sidewardly from and a predetermined distance below the distal end of the door. The extension includes an upper surface which extends from the distal end of the door to the free end and over which the cotton will be conveyed sidewardly and downwardly from the door. As a result, particularly if the cotton is compacted into a unitary body or mass, it will be directed in a predictable manner downwardly into a receptacle such as another basket located beneath the free end of the extension, so as to eliminate or substantially reduce the occurrence of problems such as cantilever extension of the cotton over the end of the door, unpredictable tipping and dropping, and missing the receiver so as to require cleanup and the like.

According to another preferred aspect of the invention, the upper surface of the extension can be oriented at a downwardly extending angle from the distal end of the door to the free end. As an example, the downward angle can be between about a 5° and a 15° angle to the cotton conveying surface of the door. The upper surface of the extension can also include a plurality of elongate rollers rotatable in a direction for conveying cotton thereover downwardly toward the free end. As an alternative preferred aspect of the invention, all or a substantial portion of the upper surface of the extension can be located a predetermined distance offset below the cotton conveying surface of the door. As another alternative, the upper surface can include a belt which is preferably powered and movable toward the free end for conveying the cotton thereover. The belt can be movable at a variable speed, including a speed faster than a speed of elements on the cotton conveying surface of the door for conveying the cotton to the extension.

As a further aspect of the invention, the extension is mountable to the door and is configured so as to be capable of remaining in the deployed position when the door is both in its open position and its closed position, and can extend upwardly from the distal end of the door when in the closed position so as to cover a portion of the open side of the basket.

As another feature of the invention, the extension when in the stored position in overlaying relation to the distal end of the door, can be located sufficiently close to the cotton conveying surface such that an upper portion of the basket can be telescopically received in a lower portion of the basket. As a result, the overall height of the basket will not be increased when the basket is configured for transport, self-propelled transport over roads and the like, and when carried on a rail car or trailer.

DETAILED DESCRIPTION OF THE INVENTION

Figure 1:
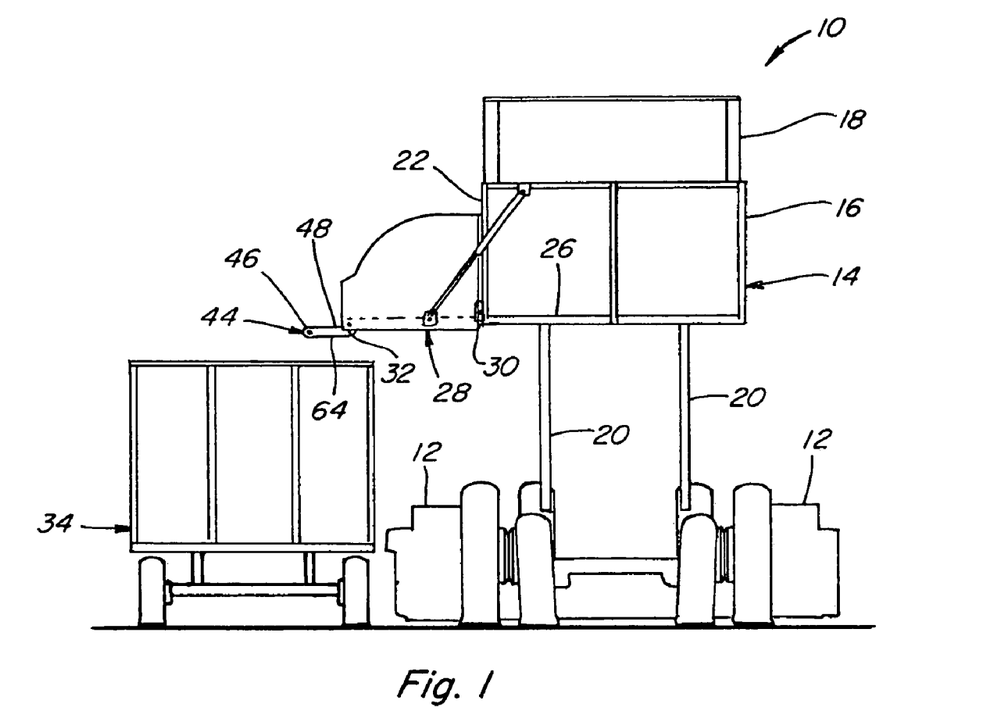
FIG. 1 is a simplified schematic rear end representation of a cotton harvester with a cotton receiving basket thereof elevated to an unloading position, an unloader door of the basket in an open position and a door extension of the invention in a deployed position for unloading cotton into an adjacent cotton receiving basket.

Referring now to the drawings, in FIG. 1, a representative conventional self-propelled cotton harvester 10 is shown. Cotton harvester 10 includes a plurality of picker units 12 arrayed across a front end thereof, and a cotton receiving basket 14 adapted for receiving and holding cotton picked by picker units 12 in the well known conventional manner. Also in the well known conventional manner, basket 14 is of telescoping construction, including a generally rectangular, upwardly open lower basket portion 16, which telescopically receives a correspondingly shaped, marginally smaller downwardly open upper basket portion 18. Basket 14 is shown in FIG. 1 with upper basket portion 18 telescopically extended from lower basket portion 16 and a cotton receiving and holding mode. Basket 14 is also shown raised to an elevated unloading position by a plurality of upstanding supports 20, also in the well known manner.

Figure 8:
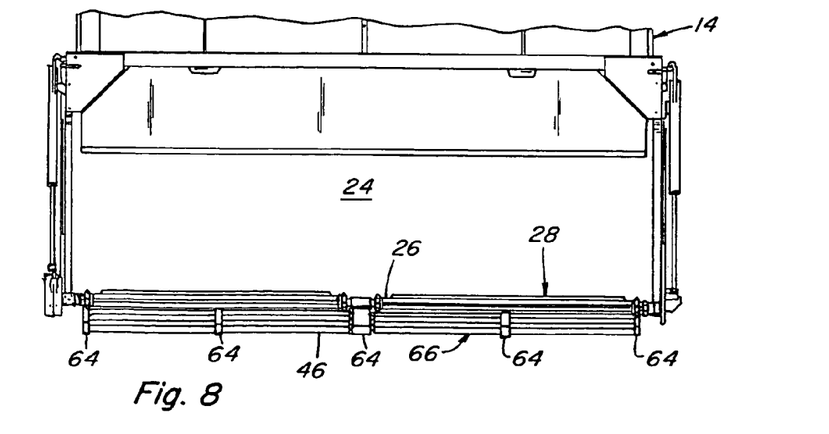
FIG. 8 is a fragmentary side view of the harvester basket of FIG. 5 with the unloader door in the open position and the extension in the deployed position.

Basket 14 has an open side 22 communicating or connecting with an interior 24 (FIG. 8) including a basket floor 26. Basket 14 further includes cotton compacting apparatus (not shown) which can comprise, for instance, one or more augers in upper basket portion 18 which are movable downwardly against cotton in interior 24 for compressing or compacting and distributing it in a desired manner within interior 24, also in the well known manner.

Figure 2:
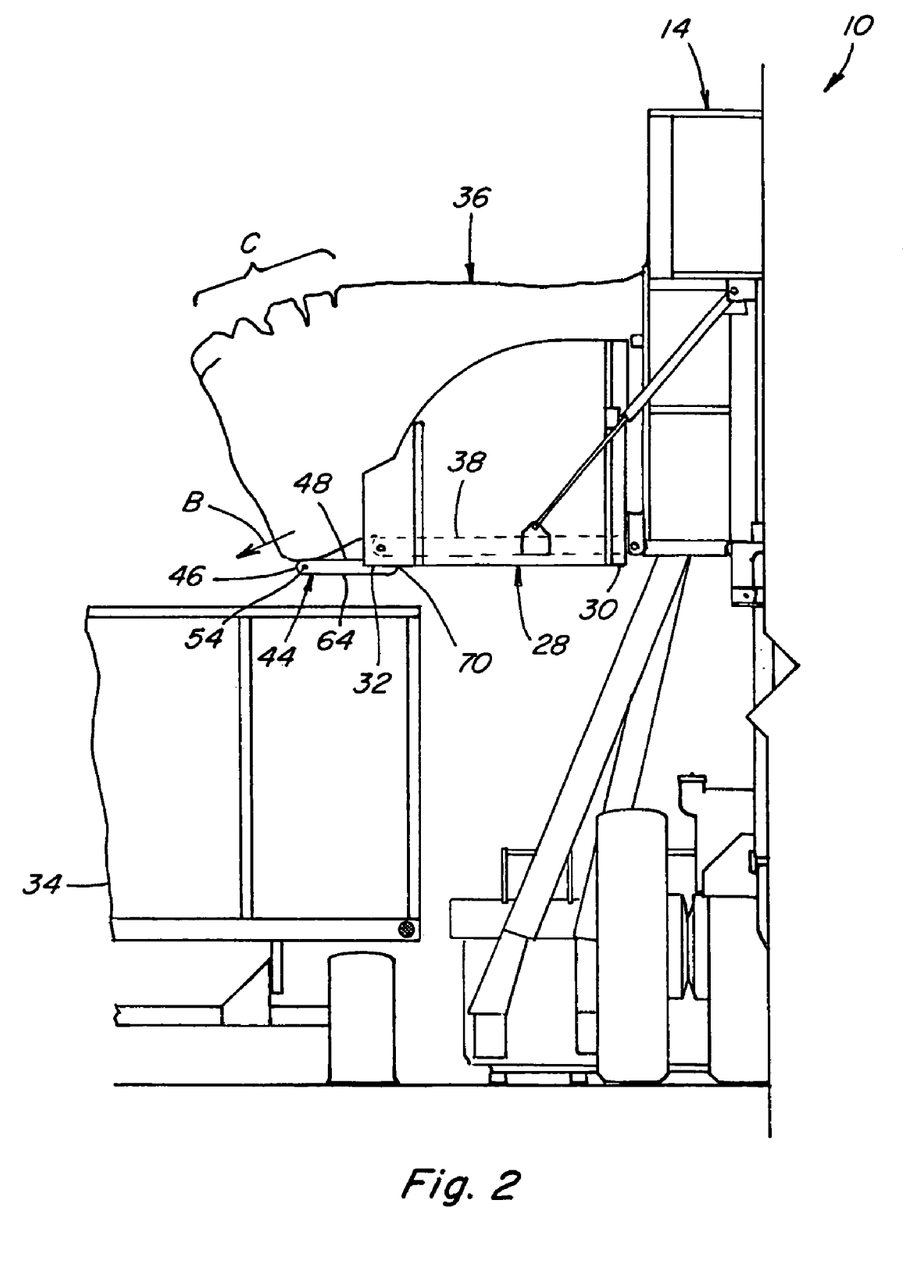
FIG. 2 is an enlarged fragmentary schematic representation of the cotton harvester and receiving basket of FIG. 1.

Referring also to FIG. 2, basket 14 of harvester 10 includes an unloader door 28 having a proximal end 30 mounted to lower basket portion 16 adjacent to floor 26 and open side 22, for pivotal movement between an open position (shown extending sidewardly therefrom), and a closed position (FIGS. 9, 10 and 11) at least partially enclosing open side 22. As will be explained, the cotton in interior 24 is unloaded by movement sidewardly across floor 26 and open door 28 over a distal end 32 thereof so as to fall or drop to another location or another cotton receiver, such as representative cotton receiving basket 34. Here, cotton being unloaded from basket 14 into basket 34 is depicted as being compacted into a cohesive or unitary body of cotton 36 having a generally rectangular shape, although it should be understood that the cotton can alternatively be compacted in a different shape mass or body, or can be less compacted or loose, as desired or required for a particular application. An important reason for compacting the cotton is to increase the capacity of basket 14, thereby reducing the required frequency of unloading.

Figure 3:
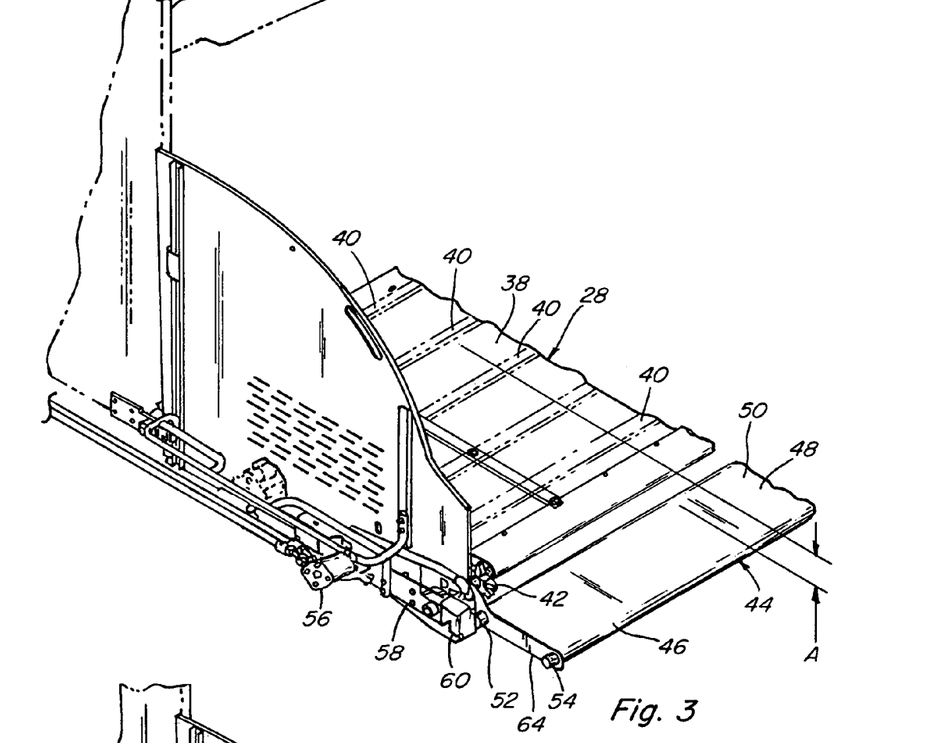
FIG. 3 is an enlarged fragmentary perspective representation of the cotton harvester basket with the unloader door in the open position and the door extension in the deployed position.
Figure 4:
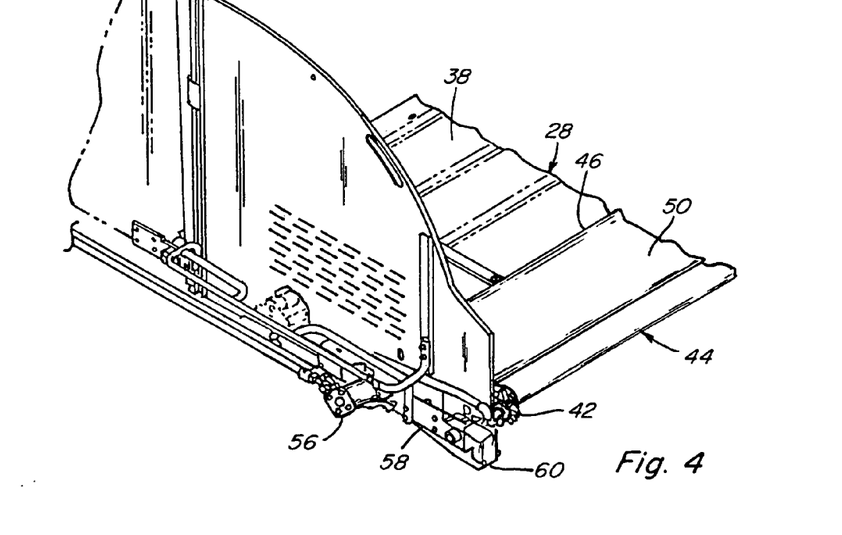
FIG. 4 is another enlarged fragmentary perspective view of the harvester basket of FIG. 1 with the unloader door in the open position and the extension in a stored position.

Referring also to FIGS. 3 and 4, door 28 has a cotton conveying surface 38 which faces upwardly when door 28 is in the open position shown. Cotton conveying surface 38 is generally flat and aligned with floor 26, and both typically include elements for conveying the cotton thereover, which can include, for instance one or more belts, drag chains, or the like, as represented by slats 40 extending forwardly and rearwardly across surface 38. Slats 40 are supported for sideward movement over surface 38 by a plurality of chains (not shown) which encircle sprockets 42 located adjacent to the proximal and distal ends 30 and 32 of door 28. Driven ones of sprockets 42 are rotated by a suitable power source, such as a fluid or electric motor, in the conventional manner as will be explained.

A body of cotton, if sufficiently cohesive, may alternatively remain together so as to fall into the receiver as a unitary member, if not otherwise broken apart. It has also been found that in some instances it is desirable to include additional picker units 12 on harvester 10 so as to increase the overall sideward extent thereof, for instance, beyond that shown in FIG. 1, thereby increasing any problems in maneuvering harvester 10 into desired relation to a receiver, such as the position shown wherein distal end 32 of door 28 is located over basket 34, if a longer or extended door is not used.

The present invention is directed at overcoming the problems set forth above by providing a door extension 44 that is mountable adjacent to distal end 32 of door 28 and has a deployed or open position for extending or increasing the sideward length of door 28, and a stored or folded position in overlaying relation to distal end 32 so as not to increase the overall height of door 28 and harvester 10. Extension 44 includes a free end 46 which when door 28 is open and extension 44 is in the deployed position is spaced sidewardly and a predetermined distance below distal end 32 of door 28, as denoted by distance A in FIG. 3. Extension 44 includes an upper surface 48 which extends from adjacent to distal end 32 of door 28 to free end 46 and over which the cotton will be conveyed sidewardly and downwardly from door 28, as illustrated by arrow B in FIG. 2. Here, surface 48 is generally parallel to and the distance A below cotton conveying surface 38 of door 28 such that it is possible that a compacted body of cotton such as body 36 conveyed over surface 48 will not be in contact with the entire sideward extent of surface 48, but instead will contact it only adjacent to free end 46. This is acceptable as it will provide guiding support for that portion of the body of cotton located thereover for controllably directing or orienting it sidewardly and downwardly so as to fall into a receiver therebelow such as the basket 34 in a predictable and controllable manner. The movement of the cotton downwardly onto the lower free end 46 can also result in some fragmenting of the cotton as illustrated at region C in FIG. 2, so as to break into and fall from extension 44 in predictable size fragments or pieces as opposed to as a unitary body or in varying size fragments. This feature is particularly advantageous with regard to the former possibility, as a unitary body of cotton could become lodged between a receiving basket such as basket 34 and the end of door 28, so as to require substantial additional handling. A combination of sideward extent of extension 44 and distance A which results in a downward orientation of the cotton at from about a 5 to a 15 degree angle relative to cotton conveying surface 38 has been found to provide the desired effect.

In this embodiment, upper surface 48 consists of one or more forward and rearward extending endless belts 50 which encircles rollers (not shown) supported for rotation adjacent to the ends of extension 44 on shafts 52 and 54. Shaft 52 can optionally be rotatably driven by a power source such as a fluid or electric motor. Here, sprockets 42 on distal end 32 of door 28 are driven by a fluid motor 56 on the forward end of door 28 via a chain drive 58, as shown in FIGS. 3 and 4. Motor 56 or drive 58 can likewise be connected in driving relation to shaft 52 when extension 44 is in its deployed position via a suitable connecting drive 60 which can include for instance a pinch roller, or an electric or fluid clutch which automatic disconnects when rotation is stopped, to allow extension 44 to be moved to its stored position as shown in FIG. 4. Connecting drive 60 can optionally be operable for rotating belt or belts 50 at varying speeds, and/or at a speed greater than a speed of slats 40 over door 28, such that the cotton is pulled over the extension as opposed to being pushed thereover. Belt or belts 50 can also include a surface which is relatively continuous and not perforated, such that cotton seeds and lint are not likely to become entangled or trapped therein. A load of cotton being unloaded over extension 44 can weigh several thousand pounds, and thus extension 44 can include suitable elements under belt or belts 50 for supporting the cotton thereon, such as additional rollers or a smooth surface over which belt 50 can ride.

Extension 44 preferably includes a suitable frame 62 of material such as sheet metal which supports and holds shafts 52 and 54 in spaced relation, along with the rollers and belt or belts 50. Frame 62 includes a plurality of L shape members 64 at the forward and rear ends of extension 44, which members 64 have ends which pivotally connect to distal end 32 of door 28 to allow pivotal movement of extension 44 between the deployed position (FIG. 3) and the stored position (FIG. 4). The L shape is advantageous as it positions extension 44 when in the deployed position at the desired location the distance A below cotton conveying surface 38, and when in the stored position in overlaying relation thereto. Suitable supports such as stops and/or a prop rod or rods can also be provided on extension 44 and on door 28 for holding extension 44 in the deployed position, as denoted by stop 70 on L shape member 64 which abuts or bears against the bottom of distal end 32 of door 28, as shown in FIG. 2.

FIGS. 5, 6, 7 and 8 show another door extension 66 constructed and operable according to the present invention for increasing the overall length of door 28 and facilitating unloading of cotton thereover in a predictable manner as explained above in reference to extension 44, like parts of extension 66 and extension 44 being identified by like numbers. Extension 66 is mountable as shown to distal end 32 of door 28 of basket 14 of harvester 10 in the above described manner for pivotal movement between a deployed position extending sidewardly from door 28, as illustrated in FIGS. 5, 6, 7 and 8, and a stored position in overlaying relation thereto, in the manner shown in FIG. 4.

Extension 66 has a free end 46 located the predetermined distance A below cotton conveying surface 38 of door 28, to provide the sought after advantage of directing or orienting cotton conveyed over extension 66 in a desired downward direction, as set forth above. Extension 66 differs from extension 44 in several respects, including by having an upper surface 48 which is directed at a downward slant relative to surface 38 of from about 5 to about 15 degrees, as denoted by angle D in FIG. 6, for effecting the sought after downward direction or orientation of the cotton. Extension 66 also differs from extension 44 by the use of a plurality of forward and rearwardly extending rollers 68 for supporting and conveying the cotton thereover, instead of belt or belts 50. The combination of slant and use of rollers is advantageous as it allows extension 66 to be unpowered, that is, rollers 68 can be free rolling as opposed to being rotatably driven. Rollers 68 can be of metal, or of plastics material so as to be lighter in weight and are preferably sufficiently close together such that a space of no more than about one inch exists between adjacent ones of rollers 68, as denoted by space E in FIG. 6.

Figure 5:
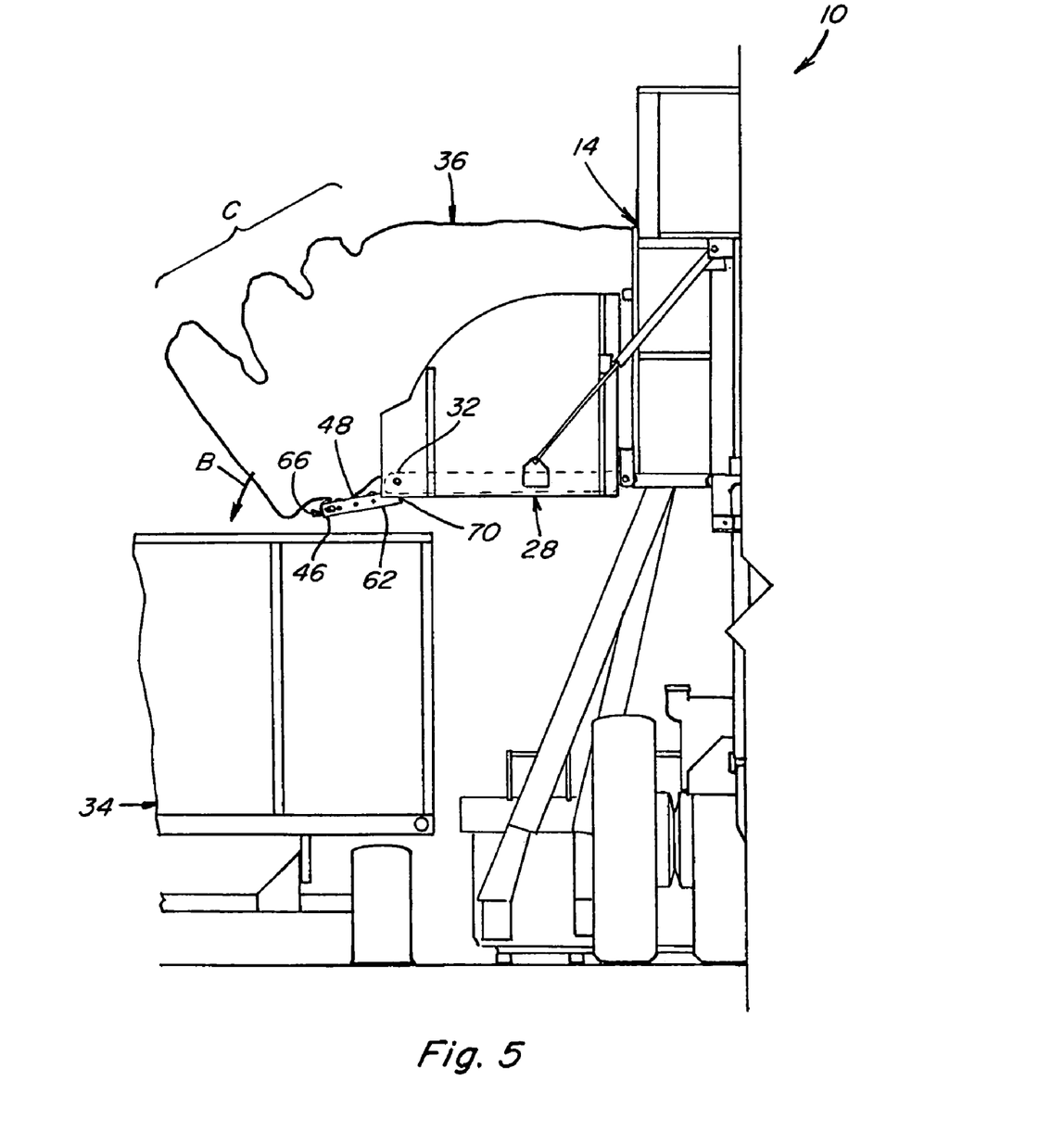
FIG. 5 is another enlarged fragmentary schematic representation of the harvester of FIG. 1, showing the basket in the raised position, the unloader door in the open position, and another embodiment of a door extension shown in a deployed position for unloading cotton into an adjacent cotton receiving basket.
Figure 6:
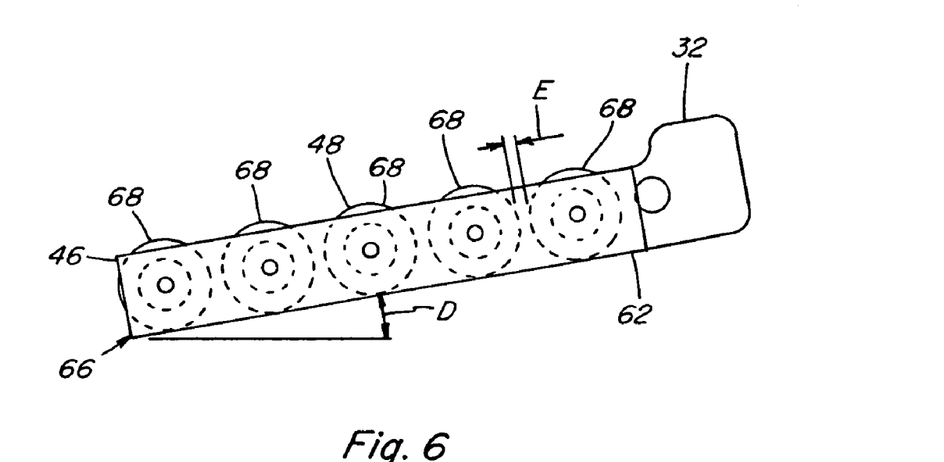
FIG. 6 is a simplified end view of the extension of FIG. 5.
Figure 7:
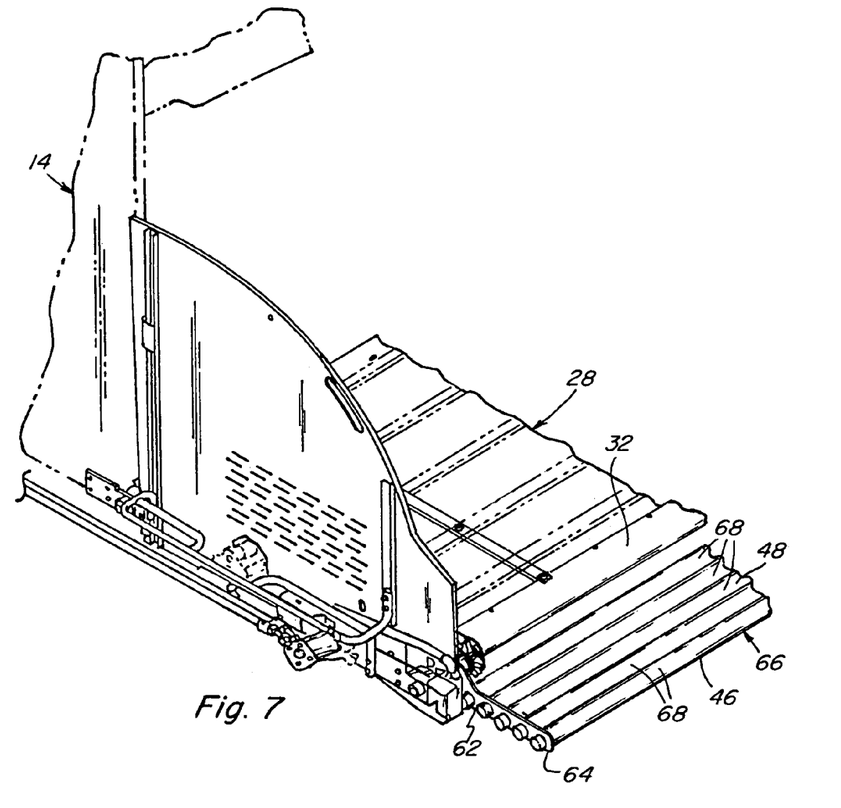
FIG. 7 is an enlarged fragmentary perspective view of the harvester basket of FIG. 5 showing the unloader door in an open position and the door extension in the deployed position.

Extension 66 also includes a frame 62, which can include a plurality of L shape members 64 having one end pivotally mounted to distal end 32 of door 28 for pivotal movement of extension 66 between its stored and deployed positions, and including supports such as stops and/or prop rods which bear against distal end 32 for positioning extension 66 at the indicated slant, as denoted by stop 70 in FIG. 5.

Also shown in FIG. 5 is a representative body of compacted cotton 36 supported and being conveyed over extension 66 so as to be directed downwardly therefrom over free end 46, as denoted by arrow B. Again, at location C, the upper region of that portion of body 36 supported on extension 66 is shown fragmenting in a predictable and desirable manner, so as to fall or drop predictably into or onto a receiver therebelow, such as cotton receiving basket 34, in a predictable manner, and not as a unitary body or in larger fragments.

Figure 9:
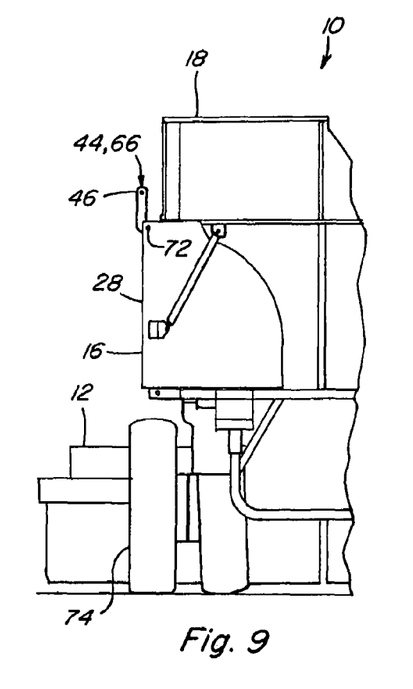
FIG. 9 is a simplified schematic rear view of the harvester of FIG. 1, showing the basket thereof in a lowered position, the unloader door in a closed position, and the extension in the deployed position.
Figure 10:
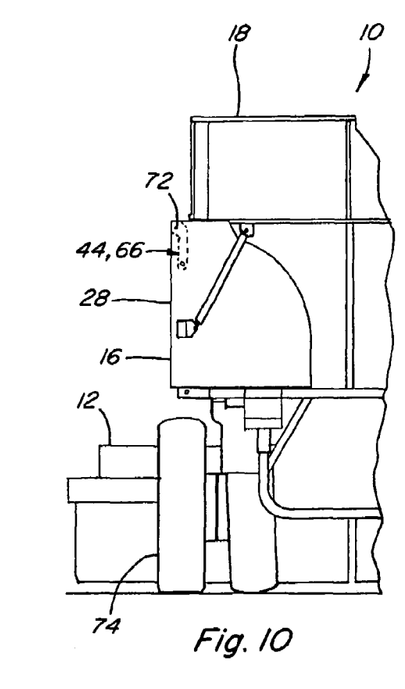
FIG. 10 is a simplified schematic rear view of the harvester of FIG. 1, showing the basket thereof in a lowered position, the unloader door in a closed position, and the extension in the stored position.
Figure 11:
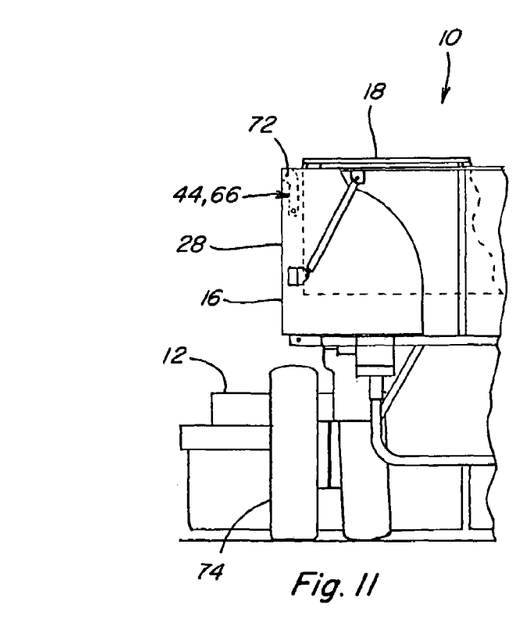
FIG. 11 is a simplified schematic rear view of the harvester of FIG. 1, showing the basket thereof in a lowered position, the unloader door in a closed position, and the extension in the stored position, with an upper portion of the basket telescopically received in a lower portion thereof.

FIGS. 9, 10 and 11 show harvester 10 with a door extension representative of extensions 44 and 66 in the deployed position with upper basket portion 18 telescopically extended from lower basket portion 16; with door extension 44, 66 in the stored position and basket portion 18 extended; and with extension 44, 66 in the stored position and basket portion 18 telescopically received in lower basket portion 16, respectively. FIGS. 9 and 10 illustrate that extensions 44, 66 can optionally remain in the deployed position when door 28 is closed, or be pivoted to the stored position, as desired. In the stored position, the interior volume of the basket is not significantly reduced by the presence of extension 44, 66. FIG. 11 illustrates that with extension 44, 66 pivoted into overlaying relation to door 28, there is sufficient clearance for the telescopic receipt of basket portion 18 in basket portion 16, without requiring increasing the overall width of harvester 10 when prepared for transport on a trailer or rail car. Here, it should be noted that for such transport, picker units 12 are typically removed. Outer wheels 74 may also be removed.

Here also, one possible pivotal connection 72 for connecting extension 44, 66 to distal end 32 of door 28 is shown. Connection 72 can be include a suitable bearing and shaft arrangement allowing pivotal movement of extension 44, 66, such as, but not limited to, a bearing on L shape member 64 which receives and is supported on a shaft on door 28, which can be, for instance, a shaft which also supports sprocket 42. As a result of at least free end 46 of extension 44, 66 being located below cotton conveying surface 38 when the extension is in the deployed position, as enabled by L shape members 64 pivotally connected to distal end 32 at pivotal connection 72, the center of gravity of extension 44, 66 is located outside of door 28 as it is pivoted to its closed position, such that the extension will not be urged by its mass toward its stored position by the movement of the door. Extensions 44, 66 can optionally include apparatus such as a fluid cylinder or the like for pivotally moving it between the deployed and stored positions, or can be manually moved, as desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a cotton harvester having a basket including an interior for receiving and holding cotton harvested by the harvester and apparatus for compacting the harvested cotton into a compacted body, the basket including an open side connecting with the interior and a door having a proximal end connected adjacent to a floor of the basket for pivotal movement between a closed position in closing relation to the open side and an open position extending sidewardly from the floor in generally parallel relation thereto, the door having a distal end opposite the proximal end and a cotton conveying surface which faces the interior when the door is in the closed position and which faces upwardly when the door is in the open position, the cotton conveying surface including elements movable for conveying the compacted cotton from the interior sidewardly to the distal end of the door, the improvement comprising:

a door extension supported adjacent to the distal end of the door for pivotal movement between a stored position in overlaying relation to the distal end of the door such that the extension is positioned within the interior of the basket, and a deployed position extending sidewardly therefrom, the door extension including a free end which when the door is open and the extension is in the deployed position is spaced sidewardly and a predetermined distance below the distal end of the door, the door extension including an upper surface which extends from the distal end of the door to the free end and over which the cotton will be conveyed sidewardly and downwardly from the door, at least the free end of the extension being located at an elevation lower than an adjacent end of the conveying surface of the door when the door is in the open position and the extension is in the deployed position such that a portion of a compacted body of cotton supported on the extension will extend in a downward direction relative to a portion of the compacted body supported on the door.

2. In the cotton harvester of claim 1, the improvement further comprising the upper surface of the door extension extending downwardly from the distal end of the door to the free end of the extension when the door is in the open position and the extension is in the deployed position.

3. In the cotton harvester of claim 2, the improvement comprising the upper surface of the extension extending downwardly from the distal end of the door at between about a 5 degree and a 15 degree angle to the cotton conveying surface of the door.

4. In the cotton harvester of claim 2, the upper surface of the extension including a plurality of elongate rollers rotatable in the downward direction for conveying cotton thereover downwardly toward the free end.

5. In the cotton harvester of claim 1, the improvement further comprising substantially the entire upper surface of the door extension when in the deployed position being generally located a predetermined distance below the cotton conveying surface of the door.

6. In the cotton harvester of claim 5, the upper surface of the door extension comprising a movable belt.

7. In the cotton harvester of claim 6, the improvement further comprising a drive for rotating the movable belt.

8. In the cotton harvester of claim 7, the improvement further comprising the drive being operable for moving the movable belt at variable speeds.

9. In the cotton harvester of clam 6, the improvement further comprising the drive being operable for moving the belt at a speed greater than a speed of the moving elements on the door.

10. In the cotton harvester of claim 1, the improvement further comprising a plurality of L shape members supporting the extension for the pivotal movement between the stored position and the deployed position and for holding the extension in the deployed position as the door is moved between the folded and open positions.

11. An extension on an unloader door of a cotton receiving basket of a cotton harvester, the door being pivotable between a closed position in covering relation to an open side of the basket and an open position extending sidewardly from the basket, the door including a cotton conveying surface which when the door is in the open position faces upwardly in at least generally parallel relation to a floor of an interior of the basket and extends sidewardly from the floor to a distal end of the door opposite the basket, the extension comprising:

a frame pivotally connected to the distal end of the door for pivotal movement relative thereto between a stored position in overlaying relation to the cotton conveying surface such that the extension is positioned within the interior of the basket, and a deployed position extending sidewardly from the distal end of the door when the door is in the open position and upwardly from the distal end of the door when the door is in the closed position, and an upper surface extending from the distal end of the door to a free end of the frame opposite the distal end, the free end being located a distance below the distal end when the door is in the open position and the frame is in the deployed position such that cotton conveyed over the upper surface will be directed downwardly thereby over the free end.

12. The extension of claim 11, further comprising the upper surface of the extension extending downwardly from the distal end of the door to the free end of the extension when the door is in the open position and the extension is in the deployed position.

13. The extension of claim 12, further comprising the upper surface of the extension extending downwardly from the distal end of the door at between about a 5 degree and a 15 degree angle to the cotton conveying surface of the door when the door is in the open position and the extension is in the deployed position.

14. The extension of claim 12, wherein the upper surface of the extension includes a plurality of elongate rollers rotatable in the downward direction for conveying cotton thereover downwardly toward the free end.

15. The extension of claim 11, further comprising substantially the entire upper surface of the extension when in the deployed position being generally located a predetermined distance below the cotton conveying surface of the door.

16. The extension of claim 15, wherein the upper surface of the extension comprises a movable belt.

17. The extension of claim 16, further comprising a drive for rotating the movable belt.

18. The extension of claim 17, further comprising the drive being operable for moving the movable belt at variable speeds.

19. The extension of claim 16, wherein the cotton conveying surface of the door includes movable elements drivable at a speed for conveying the cotton thereover and the drive is operable for moving the belt at a speed greater than the speed of the moving elements on the door.

20. The extension of claim 11, wherein the frame comprises a plurality of L shape members supporting the extension for the pivotal movement between the stored position and the deployed position and for holding the extension in the deployed position as the door is moved between the folded and open positions.

21. An unloader door arrangement for a cotton receiving basket of a cotton harvester, comprising:
an unloader door including a proximal end mounted to the basket for pivotal movement of the door between a closed position in partial covering relation to an open side of the basket and an open position extending sidewardly from the basket, a distal end opposite the proximal end and a cotton conveying surface extending between the proximal and distal ends, the cotton conveying surface being oriented so as to face upwardly and being positioned so as to be at least generally parallel to a floor of an interior of the basket and extending sidewardly from the floor when the door is in the open position; and an extension connected to the distal end of the door for pivotal movement relative thereto between a stored position in overlaying relation to the cotton conveying surface such that the extension is positioned within the interior of the basket, and a deployed position extending sidewardly therefrom when the door is in the open position and upwardly therefrom when the door is in the closed position so as to cover a portion of the open side of the basket, the extension including an upper surface extending from the distal end of the door to a free end, the free end being located a distance below the distal end when the door is in the open position and the extension is in the deployed position such that cotton conveyed over the upper surface will be moved downwardly toward the free end.

22. The unloader door ar ement of claim 21, further comprising the upper surface of the extension extending downwardly from the distal end of the door to the free end of the extension when the door is in the open position and the extension is in the deployed position.

23. The unloader door arrangement of claim 22, further comprising the upper surface of the extension extending downwardly from the distal end of the door at between about a 5 degree and a 15 degree angle to the cotton conveying surface of the door when the door is in the open position and the extension is in the deployed position.

24. The unloader door arrangement of claim 22, wherein the upper surface of the extension includes a plurality of elongate rollers rotatable in the downward direction for conveying cotton thereover downwardly toward the free end.

25. The unloader door arrangement of claim 21, further comprising substantially the entire upper surface of the extension when in the deployed position being generally located a predetermined distance below the cotton conveying surface of the door.

26. The unloader door arrangement of claim 25, wherein the upper surface of the extension comprises a movable belt.

27. The unloader door arrangement of claim 26, further comprising a drive for rotating the movable belt.

28. The unloader door arrangement of claim 27, further comprising the drive being operable for moving the movable belt at variable speeds.

29. The unloader door arrangement of claim 26, wherein the cotton conveying surface of the door includes movable elements drivable at a speed for conveying the cotton thereover and the drive is operable for moving the belt at a speed greater than the speed of the moving elements on the door.

30. The unloader door arrangement of claim 21, wherein the extension comprises a frame including a plurality of L shape members supporting the extension for the pivotal movement between the stored position and the deployed position and for holding the extension in the deployed position as the door is moved between the folded and open positions.

* * * * *